United States Patent
Kong et al.

(10) Patent No.: US 11,724,649 B2
(45) Date of Patent: Aug. 15, 2023

(54) CAMERA MONITORING SYSTEM AND METHOD OF CONTROLLING SAME

(71) Applicants: Hyundai Motor Company, Seoul (KR); Kia Motors Corporation, Seoul (KR)

(72) Inventors: Nak Kyoung Kong, Gyeonggi-do (KR); Jong Min Park, Seoul (KR); Ki Hong Lee, Seoul (KR); Seung Sik Han, Gyeonggi-do (KR); Seung Hyeok Chang, Gyeonggi-do (KR); Yong Hwan Kim, Gyeonggi-do (KR); Yeong Kook Cho, Gyeonggi-do (KR); Chang Byung Ryu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 418 days.

(21) Appl. No.: 17/026,678

(22) Filed: Sep. 21, 2020

(65) Prior Publication Data
US 2021/0284068 A1 Sep. 16, 2021

(30) Foreign Application Priority Data
Mar. 16, 2020 (KR) .......................... 10-2020-0032073

(51) Int. Cl.
*B60R 1/26* (2022.01)
*B60R 1/12* (2006.01)
*B60R 1/074* (2006.01)

(52) U.S. Cl.
CPC ................ *B60R 1/26* (2022.01); *B60R 1/074* (2013.01); *B60R 1/12* (2013.01);
(Continued)

(58) Field of Classification Search
CPC ... B60R 1/074; B60R 1/12; B60R 2001/1253; B60R 1/26; B60R 1/25; B60R 1/072; B60R 1/07; B60R 1/006; B60R 1/02
(Continued)

(56) References Cited

U.S. PATENT DOCUMENTS

2003/0103142 A1* 6/2003 Hitomi .................... B60R 11/04
348/148
2015/0165975 A1* 6/2015 Meadows ............... B60R 1/074
701/49
(Continued)

FOREIGN PATENT DOCUMENTS

CN 104442575 3/2015
KR 10-2007-0063485 A 6/2007
(Continued)

*Primary Examiner* — Nathnael Aynalem
(74) *Attorney, Agent, or Firm* — Fox Rothschild LLP

(57) ABSTRACT

A camera monitoring system and a method of controlling the same are provided. The camera monitoring system includes a camera assembly that captures an image of an outer side surface of a vehicle and a mirror assembly disposed to overlap at least a portion of the camera assembly. A driver performs deployment and folding of the camera assembly and the mirror assembly. A controller operates the driver in response to an input of the deployment or folding of the camera assembly and the mirror assembly and determines a failure of the camera assembly. The camera assembly and the mirror assembly are moved based on a single drive shaft, and the controller deploys or folds the camera assembly and the mirror assembly.

10 Claims, 13 Drawing Sheets

(52) U.S. Cl.
   CPC ... *B60R 2001/1253* (2013.01); *B60R 2300/10* (2013.01); *B60R 2300/8066* (2013.01)

(58) Field of Classification Search
   USPC .......................................................... 348/148
   See application file for complete search history.

(56) References Cited

U.S. PATENT DOCUMENTS

| | | | |
|---|---|---|---|
| 2019/0161014 A1* | 5/2019 | Ko | B60S 1/02 |
| 2020/0156592 A1* | 5/2020 | Zaharia | B60R 1/00 |
| 2021/0024011 A1* | 1/2021 | Sakata | B60R 11/04 |

FOREIGN PATENT DOCUMENTS

| | | | | |
|---|---|---|---|---|
| KR | 20130057778 A | * | 6/2013 | B60R 1/06 |
| KR | 101299120 | | 8/2013 | |

\* cited by examiner

CAMERA MONITORING SYSTEM AND METHOD OF CONTROLLING SAME

CROSS-REFERENCE TO RELATED APPLICATION

This application claims under 35 U.S.C. § 119(a) the benefit of priority to Korean Patent Application No. 10-2020-0032073 filed on Mar. 16, 2020, the entire contents of which are incorporated herein by reference.

BACKGROUND

(a) Technical Field

The present disclosure relates to a camera monitoring system and a method of controlling the same, and more particularly, to a camera monitoring system capable of simultaneously or sequentially operating a camera assembly and a mirror assembly through a single driver and providing an auxiliary side view in response to a failure of a camera monitoring system, and a method of controlling the same.

(b) Background Art

Generally, a driver performs a lane change of a vehicle using a mirror installed at a front center within the vehicle and side mirrors. In particular, when the driver performs the lane change while looking at the side mirror in a driving direction, an accident may occur with a vehicle driving in a blind spot or a vehicle driving at a front side of the vehicle.

Further, when the vehicle is parked or stopped, the existing side mirrors are folded in a state of protruding to the outside, and thus the existing side mirrors may be damaged due to a physical impact applied thereto. Recently, a camera mirror system (CMS), which is configured to display an external situation of a vehicle on a screen through an external camera lens, is being developed.

As described above, a vehicle to which the CMS is introduced to is configured to capture an external situation of the vehicle through an external camera protruding outward from the vehicle and display an image captured by the external camera on a display mounted within the vehicle. FIG. 1 is a diagram illustrating a configuration of an external camera pivoted to protrude from an outer surface of a vehicle according to a related art.

As shown in the drawing, the external camera includes an external camera 20 disposed on one side of a door 11 of a vehicle, a first lens 30, and a second lens 31 and is configured to be pivotable in the door 11. However, even when the external camera is inserted into the door 11, the external camera configured to be located in the door 11 to protrude therefrom is exposed in the protruding shape, and thus risks of damage and theft still remain. Further, in response to a failure of a camera monitoring system, a part for providing an auxiliary side view is indispensably required.

SUMMARY

The present disclosure provides a camera monitoring system located on an outer side surface of a vehicle and a structure capable of protecting a camera in an external environment. In another aspect, the present disclosure provides a camera assembly and a mirror assembly which are capable of being deployed using a single drive shaft. In still another aspect, the present disclosure provides a structure capable of providing a side view to a user when the camera assembly fails.

Objectives of the present disclosure are not limited to the above-described objectives, and other objectives of the present disclosure, which are not mentioned, maybe understood by the following description and also will be apparently understood through embodiments of the present disclosure. Further, the objectives of the present disclosure maybe implemented by means described in the appended claims and a combination thereof. A camera monitoring system and a method of controlling the same for achieving the above-described objectives of the present disclosure include the following configuration.

In an exemplary embodiment, the present disclosure provides a camera monitoring system that may include a camera assembly configured to capture an outer side surface of a vehicle, a mirror assembly configured to overlap at least a portion of the camera assembly, a driver configured to perform deployment and folding of the camera assembly and the mirror assembly, and a controller configured to operate the driver in response to an input of the deployment or folding of the camera assembly and the mirror assembly and determine a failure of the camera assembly. The camera assembly and the mirror assembly are moved based on a single drive shaft, and the controller may be configured to deploy or fold the camera assembly and the mirror assembly.

Further, the camera assembly may include a camera housing configured to be engaged with a vehicle body, a camera disposed in the camera housing and configured to capture the outer side surface of the vehicle, a camera driver configured to pivot the camera housing by the driver, a camera drive gear disposed at least a portion inside the camera driver and configured to transmit a driving force of the driver, and a display disposed inside the vehicle and configured to display an image captured by the camera.

Further, the mirror assembly may include a mirror housing formed to allow the camera assembly to be inserted thereinto, a mirror driver configured to pivot the mirror housing by the driver, and a mirror drive gear disposed at least a portion inside the mirror driver and disposed to allow the mirror housing to be pivoted and deployed after the camera assembly is pivoted and deployed. Further, the driver may include a motor disposed in a vehicle body, and a drive gear disposed at one end of the motor and between a camera driver and a mirror driver.

When the camera assembly is deployed, the drive gear may be engaged with a camera drive gear, and, when the mirror assembly is deployed, the drive gear may be selectively engaged with a mirror drive gear. Further, the camera driver may have a radius that is greater than that of the mirror driver, and the drive gear may be disposed between the mirror driver and the camera driver.

Additionally, the camera monitoring system may further include a boss portion spaced apart from a camera drive gear and disposed inside the camera driver, and the boss portion may be configured such that, after the camera assembly is deployed, a mirror drive ear may be engaged with the drive gear. When the camera assembly is determined as failing, the controller may be configured to move the boss portion to thus engage the mirror drive gear and the drive gear with each other.

In another exemplary embodiment, the present disclosure provides a method of controlling a camera monitoring system, which may include checking states of a camera assembly and a mirror assembly, when the camera assembly and the mirror assembly are determined to be in a folded state, determining whether a user's request is input, deploying the camera assembly in response to the user's request, determining whether the camera assembly fails, and when the camera assembly is determined as failing, deploying the mirror assembly.

Further, the deploying of the camera assembly may include rotating a camera drive gear through a driver disposed in a vehicle body. The deploying of the camera assembly may include rotating a mirror drive gear through a driver disposed in a vehicle body. In addition, the determining of whether the camera assembly fails may include outputting an alarm to a user when the camera assembly is determined as failing. The outputting of the alarm to the user may include determining whether a mirror deployment input of the user is present, and when the mirror deployment input of the user is present, performing the deploying of the mirror assembly. When the camera assembly is determined as failing, the deploying of the mirror assembly may include determining whether the camera assembly operates normally, and when the camera assembly operates normally, folding the mirror assembly.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
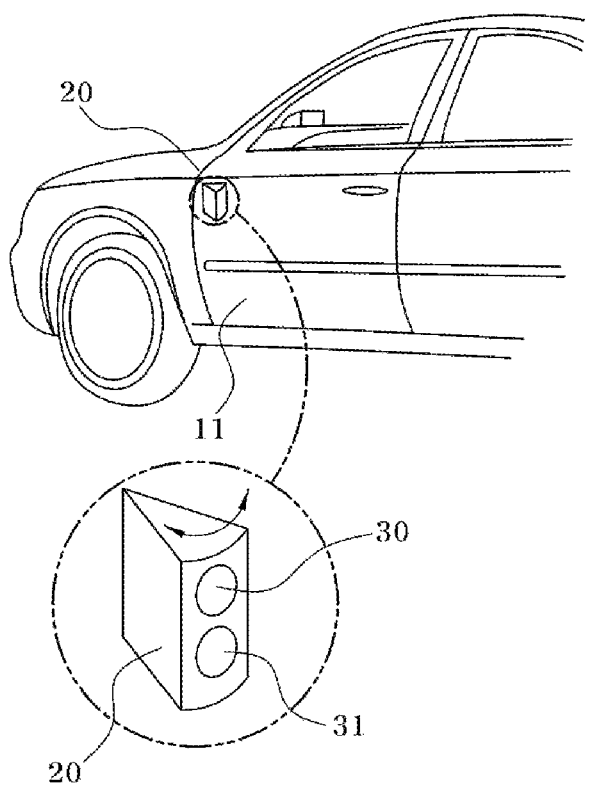
FIG. 1 is a diagram illustrating a configuration of a vehicle including a camera monitoring system according to a related art.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. The exemplary embodiments of the present disclosure maybe modified in various forms, and the scope of the present disclosure should not be construed as being limited to the following embodiments. These exemplary embodiments are provided to more fully describe the present disclosure to those skilled in the art. The terms "~part," "~gear," "~assembly," and the like used herein mean a unit for processing at least one function or operation, and this unit may be implemented by hardware, software, or a combination of hardware and software.

The present disclosure relates to a camera monitoring system 100, and more particularly, to the camera monitoring system 100 disposed on a side surface of a vehicle body 300 and deployed outward or folded to a position close to the vehicle body 300 based on a user's request. The camera monitoring system 100 may be operated by a controller.

The camera monitoring system 100 of the present disclosure may include a camera housing 115 having a camera 111 and a camera driver 112 configured to pivot the camera housing 115, and the camera 111 may be configured to deploy the camera housing 115 to capture a rear side of a vehicle based on a user's request. Thus, the captured rear side image may be transmitted by the camera monitoring system 100 to a display (not shown) mounted within the vehicle, and thus, even in a state in which a mirror 121 is not present, the captured rear side image of the vehicle may be displayed to the interior of the vehicle.

In the present disclosure, the display may be formed on an inner side surface of the vehicle or at a position adjacent to an A-pillar and formed in the interior of the vehicle without restriction as long as capable of displaying the captured rear side image to a user. In particular, the display of the present disclosure may be disposed at inner left and right sides of the vehicle and may include a left camera 111 and a right camera 111 which are connected to the display.

The camera monitoring system 100 of the present disclosure is a concept including the left and right cameras 111, and the left and right cameras 111 may be symmetrically mounted at left and right side of the vehicle. Further, a mirror assembly 120 of the present disclosure may overlap at least a portion of a camera assembly 110. In one exemplary embodiment of the present disclosure, the camera housing 115 may be inserted and disposed inside a mirror housing 125.

Further, a controller 200 of the present disclosure may be disposed inside the vehicle or in the camera monitoring system 100. The controller 200 may be configured to determine whether the user request is received or the camera assembly 110 fails and execute deployment or folding of the camera assembly 110 or the mirror assembly 120 according to a predetermined condition. The controller 200 may be configured to apply power to a driver 130 to execute the deployment or folding of the camera assembly 110 or the mirror assembly 120 in a predetermined condition.

Figure 2A:
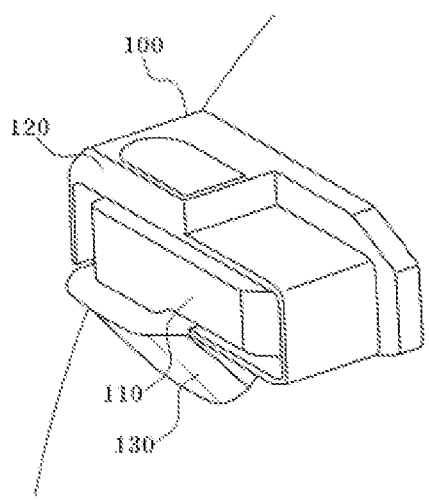
FIG. 2A is a perspective view illustrating a camera monitoring system in a folded state according to one exemplary embodiment of the present disclosure.
Figure 2B:
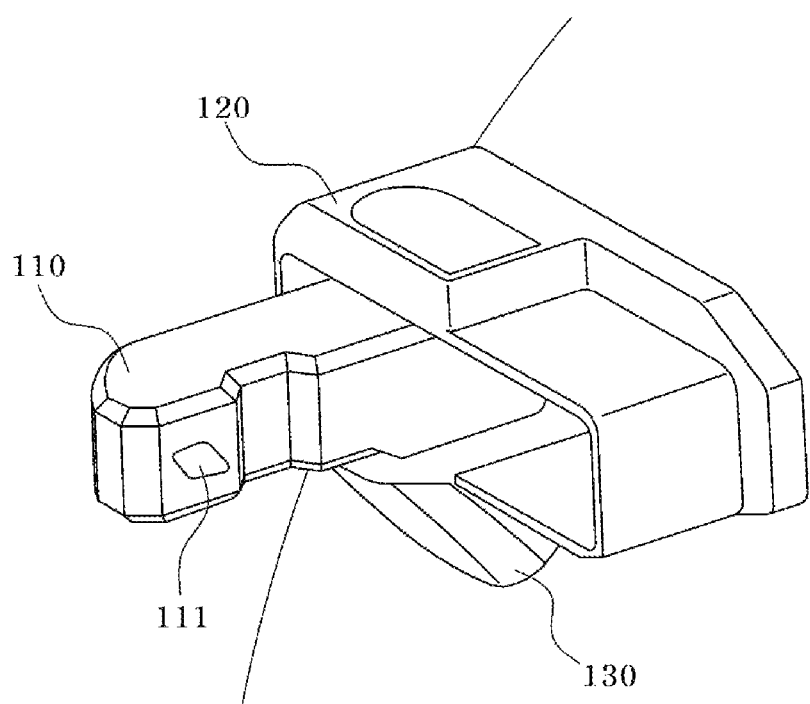
FIG. 2B is a perspective view illustrating the camera monitoring system in a state in which a camera assembly is deployed according to one exemplary embodiment of the present disclosure.
Figure 2C:
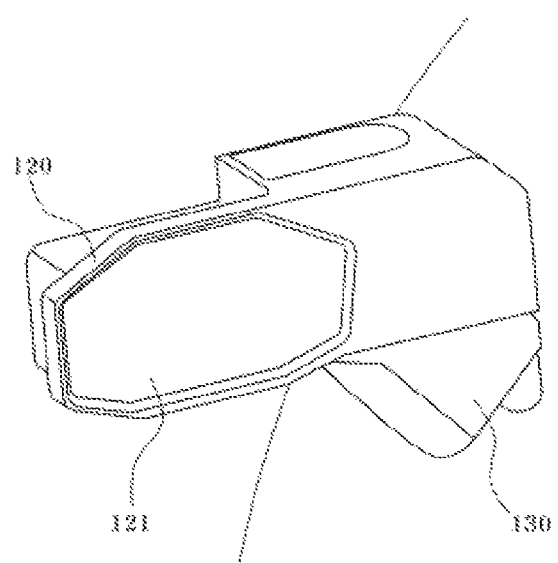
FIG. 2C is a perspective view illustrating the camera monitoring system in a state in which a mirror assembly is deployed according to one exemplary embodiment of the present disclosure.

FIGS. 2A to 2C sequentially illustrate a folded state of the camera monitoring system 100, a state in which the camera assembly 110 is deployed, and a state in which the mirror assembly 120 is deployed according to one exemplary embodiment of the present disclosure. FIG. 2A illustrates the camera monitoring system 100 disposed in the vehicle body 300 and discloses a configuration in which the camera assembly 110 and the mirror assembly 120 are disposed adjacent to each other.

More particularly, the camera assembly 110 may be inserted into and disposed at one side end of the mirror assembly 120, and a first end of the camera assembly 110 may be pivoted and deployed in a direction away from the vehicle body 300 according to motor driving of the driver 130. The camera 111 configured to capture a side image of the vehicle may be disposed on a second end of the camera assembly 110, and the camera driver 112 configured to pivot the camera housing 115 may be disposed at the first end of the camera assembly 110.

The camera monitoring system 100 may include the mirror assembly 120 which is adjacent to the camera assembly 110 and may be pivoted around the same rotation axis as the camera assembly 110. The mirror assembly 120 may include the mirror housing 125, the mirror 121 disposed at a distal end of the mirror housing 125, and a mirror driver 122 having the same drive axis as the camera driver 112 and disposed inside the camera driver 112.

The camera driver 112 and the mirror driver 122 may be mounted based on the same axis and may include a camera drive gear 113 and a mirror drive gear 123 disposed adjacent to a drive gear 131 of the driver 130. In particular, the camera drive gear 113 and the mirror drive gear 123 may be configured to be rotated along the same central axis, and the drive gear 131 of the driver 130 may be disposed between the camera drive gear 113 and the mirror drive gear 123. The drive gear 131 may be configured to receive a rotational force from a motor disposed in the vehicle body 300 or the driver 130 and may include the camera drive gear 113 disposed inside the camera driver 112 to correspond to the drive gear 131.

The camera drive gear 113 may be disposed inside the camera driver 112 and may be formed in at least a portion of the camera driver 112 and configured to apply the rotational force of the motor by being engaged with the drive gear 131. Further, the camera drive gear 113 may be disposed such that the camera assembly 110 is capable of being pivoted by up to a predetermined angle to allow the camera assembly 110 to be deployed or folded.

The mirror drive gear 123 disposed in at least a portion inside the mirror driver 122 may be engaged with the drive gear 131 and deployed after the camera drive gear 113 is deployed or may be switched to a folded state in advance before the camera assembly 110 is folded when the deployed camera monitoring system 100 is switched to the folded state. In summary, the camera drive gear 113 and the mirror drive gear 123 may be formed in a predetermined region to receive the same amount of rotation based on the central axis and may be disposed to sequentially deploy the camera assembly 110 and the mirror assembly 120.

FIG. 2B illustrates a state in which the driving force of the driver 130 is applied to the camera driver 112 through the drive gear 131, and thus the camera assembly 110 is deployed. When the camera assembly 110 is deployed, the drive gear 131 may be engaged with the camera drive gear 113. In this state, the mirror drive gear 123 may be spaced apart from the drive gear 131 so that the driving force of the driver 130 is not transmitted to the mirror assembly 120.

As described above, the rotational force of the drive gear 131 may be transmitted to the camera drive gear 113, and the camera housing 115 formed integrally with the camera driver 112 may be pivoted simultaneously. Thus, one end of the camera assembly 110 may be pivoted in a direction away from the vehicle body 300.

FIG. 2C illustrates a state of the camera monitoring system 100 when a failure of the camera assembly 110 is detected by the controller 200 or when a user's request is input to the controller 200, and thus the controller 200 may be configured to receive a request for deployment of the mirror assembly 120. The controller 200 is a component of the camera assembly 110 and may be configured to deploy the mirror assembly 120 in a condition in which an error of the camera 111 or the display occurs or a communication error occurs.

Alternatively, even when the user's request for deployment the mirror assembly 120 is received at the controller 200, the controller 200 may be configured to apply a driving force to the mirror assembly 120 to provide a side view through the mirror 121. In particular, the failure of the camera assembly 110 of the present disclosure may include all cases in which a side image is difficult to be transmitted to the user through the camera 111.

For the deployment of the mirror assembly 120 in a state in which the camera assembly 110 is deployed, a boss portion 114 spaced further apart from the camera drive gear 113 may be configured to be rotated to move one side of the mirror drive gear 123 inside the camera driver 112 and configured to engage the mirror drive gear 123 with the drive gear 131 of the driver 130. Further, when the camera driver 112 is rotated such that the mirror drive gear 123 and the drive gear 131 are engaged with each other, a coupling between the camera drive gear 113 and the drive gear 131 may be released.

In a state in which the mirror drive gear 123 and the drive gear 131 are engaged with each other, and the engagement between the camera drive gear 113 and the drive gear 131 is released, the driving force of the drive gear 131 may be transmitted to the mirror drive gear 123, and thus the mirror driver 122 and the mirror housing 125 may be pivoted integrally. As described above, the rotated mirror assembly 120 may be inserted to surround at least a portion of the camera assembly 110 and configured to provide a side view of the vehicle to the user through one side surface on which the mirror 121 is located.

Figure 3A:
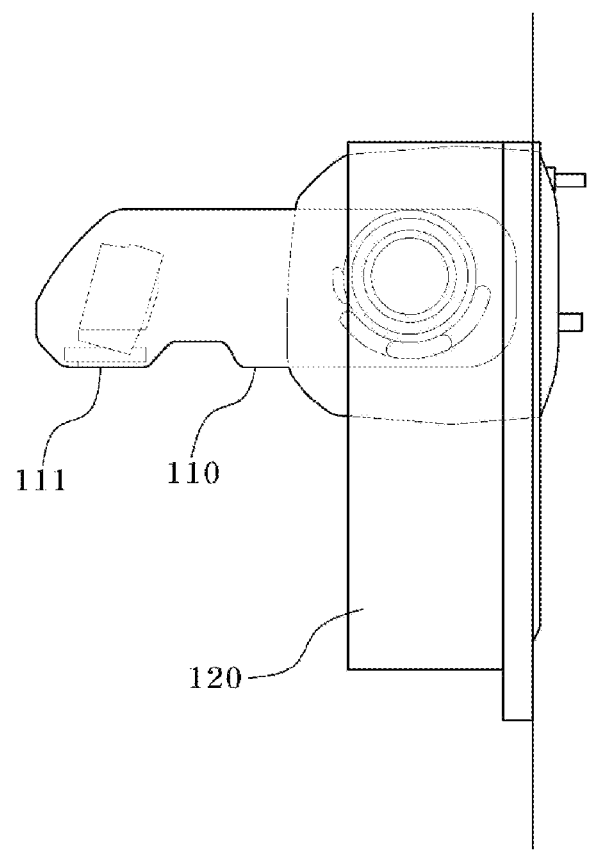
FIG. 3A is a front view illustrating the camera monitoring system in a state in which the camera assembly is deployed according to one exemplary embodiment of the present disclosure.

FIG. 3A illustrates a front view of the camera monitoring system 100 in a state in which the camera assembly 110 is deployed. The camera assembly 110 may be configured to be pivoted through the drive gear 131 of the driver 130. In particular, the camera drive gear 113 may be configured to receive the rotational force of the drive gear 131 to pivot the camera housing 115.

The camera drive gear 113 may be disposed at least a portion inside the camera driver 112 to pivot the camera assembly 110 by up a predetermined angle. In other words, the camera drive gear 113 may be formed in a region that corresponds to the same angle as the deployment angle of the camera assembly 110 based on the central axis or formed in a region corresponding to more than the deployment angle. Particularly, the camera driver 112 may be configured to have the substantially same radius of rotation as the mirror driver 122 or a radius of rotation that is greater than that the mirror driver 122.

Figure 3B:
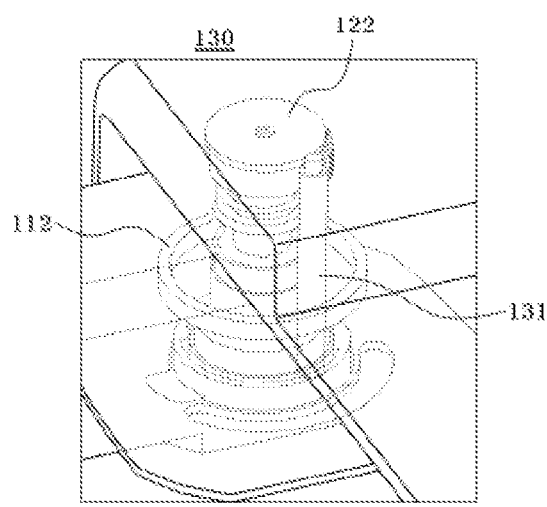
FIG. 3B is a perspective view illustrating a driver of the camera monitoring system according to one exemplary embodiment of the present disclosure.

FIG. 3B illustrates an engagement relationship between the camera driver 112, the mirror driver 122, and the driver 130. As shown in the drawing, the camera driver 112 and the mirror driver 122 are formed to have the same central axis, and in particular, the mirror driver 122 may be disposed inside the camera driver 112. The drive gear 131 of the driver 130 may be disposed between an inner side of the camera driver 112 and an outer side of the mirror driver 122 and configured to selectively apply the driving force to the camera driver 112 and the mirror driver 122.

The controller 200 may be configured to deploy the camera assembly 110 in response to a starting condition of the vehicle and a user's request and configured to apply power to the driver 130 such that the camera assembly 110 performs pivoting. Accordingly, the camera assembly 110 may be pivoted and opened to dispose the camera 111 in a position to capture an image of an outer side surface of the vehicle. After the camera assembly 110 is deployed, the mirror driver 122 may be configured to release the engagement between the camera assembly 110 and the driver 130 according to an additional rotation of the driver 130 and configured to perform an engagement between the mirror drive gear 123 and the drive gear 131.

Particularly, the camera assembly 110 may include the boss portion 114 formed at a position spaced apart from the camera drive gear 113 and thus, when the camera driver 110 is further rotated in a state in which the camera assembly 110 is deployed, the boss portion 114 may be configured to move the mirror drive gear 123 to be engaged with the drive gear 131 of the driver 130. Further, when the mirror drive gear 123 is engaged with the drive gear 131, the camera drive gear 113 may be configured to be released from the drive gear 131. Thus, the driving force applied from the driver 130 may be transmitted to the mirror assembly 120, and the mirror assembly 120 may be deployed to a position substantially adjacent to the camera assembly 110.

The mirror drive gear 123 may be disposed at least a portion of the inner surface of the mirror driver 122 so that the mirror drive gear 123 may be disposed at a predetermined position inside the mirror driver 122 to correspond to a deployment angle of the mirror assembly 120. When the camera drive gear 113 is deployed, the mirror drive gear 123 may be configured to maintain a state in which the engagement with the drive gear 131 is released, and, when a user's request or a failure of the camera assembly 110 is applied in a state in which the camera assembly 110 is fully deployed, the mirror drive gear 123 is configured such that the mirror drive gear 123 and the drive gear 131 are engaged with each other, and the mirror assembly 120 may be deployed.

In other words, the boss portion 114 disposed inside the camera driver 112 may be included such that the camera driver 112 is further rotated and thus the mirror drive gear 123 is engaged with the drive gear 131 of the driver 130. The boss portion 114 may be configured to rotate the mirror drive gear 123 according to the rotation of the camera driver 112, and the rotated mirror drive gear 123 may be engaged with the drive gear 131 of the driver 130. Therefore, a region of the camera drive gear 113 disposed inside the camera driver 112 formed in a cylindrical shape may be disposed to have a predetermined angle based on the central axis, and an angle of the region in which the camera drive gear 113 is disposed may be greater than an angle in which the mirror drive gear 123 is disposed.

Figure 4A:
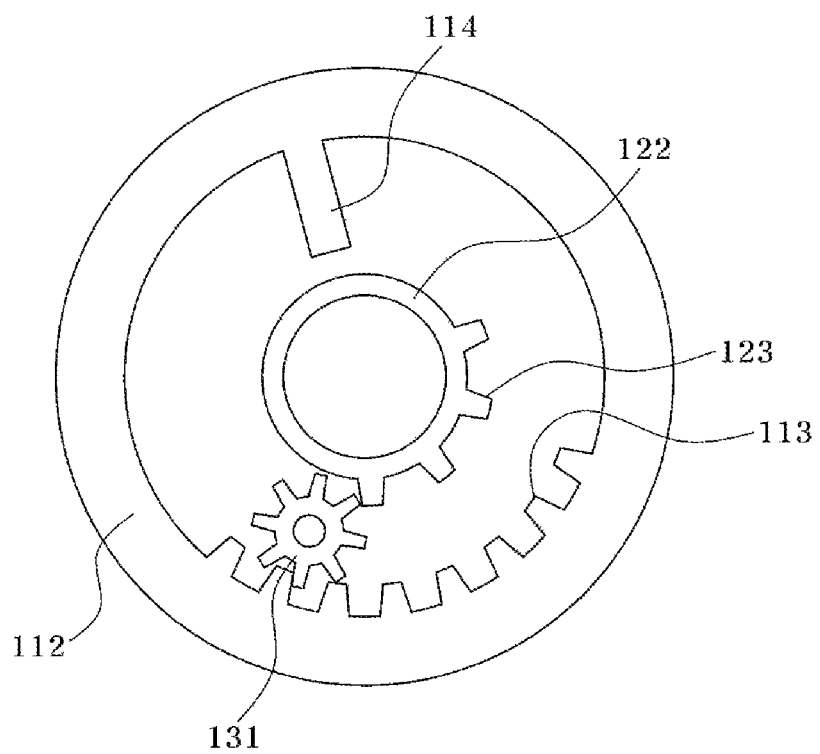
FIG. 4A is a cross-sectional view illustrating the driver in a folded state according to one exemplary embodiment of the present disclosure.

FIG. 4A illustrates a coupling relationship between the camera driver 112, the mirror driver 122, and the drive gear 131 in a state in which the camera monitoring system 100 is folded. As shown in the drawing, the camera driver 112 may include the camera drive gear 113 formed in a region having a predetermined angle from the central axis inside the camera driver 112, and the camera drive gear 113 may be engaged with the drive gear 131 in a state in which the camera monitoring system 100 is folded.

Further, the mirror drive gear 123 may be disposed in a region having a predetermined angle on the outer side the mirror driver 122 and spaced apart from the drive gear 131 in the state in which the camera monitoring system 100 is folded. The boss portion 114 disposed inside the camera driver 112 may be formed at a position having a 180-degree phase difference as compared to the region in which the camera drive gear 113 is disposed based on the central axis. Therefore, in the state in which the camera monitoring system 100 is folded, the boss portion 114 may be spaced apart from the mirror drive gear 123.

Figure 4B:
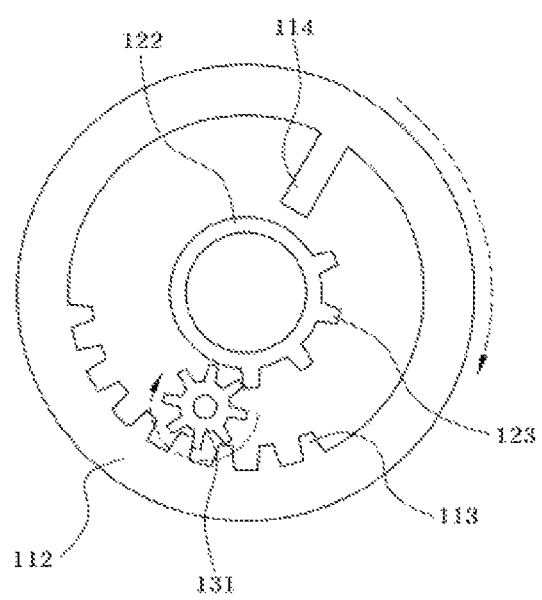
FIG. 4B is a cross-sectional view illustrating the driver in a state in which the camera assembly is deployed according to one exemplary embodiment of the present disclosure.

FIG. 4B illustrates a cross section of the driver 130 in a state in which the controller 200 deploys the camera assembly 110 according to predetermined condition. In response to a vehicle being started or a user's request for deployment being input, the controller 200 may be configured to apply power to the motor of the driver 130 and configured to apply a rotational force to the camera drive gear 113 engaged with the drive gear 131 in a state in which the first camera monitoring system 100 is initially folded.

The camera drive gear 113 may be configured to be rotated in the same direction as the drive gear 131 and configured to pivot the camera assembly 110 in a direction in which a first end of the camera housing 115 is distant from the vehicle body 300. Further, while the camera drive gear 113 is rotated by up to a predetermined angle along the drive gear 131, the mirror drive gear 123 may be maintained in a separated state from the drive gear 131 to not apply the driving force. As described above, the camera assembly 110 may be opened and pivoted in response to the driving force of the driver 130 and configured to dispose the camera 111 at a position at which the side image of the vehicle is captured.

Figure 5A:
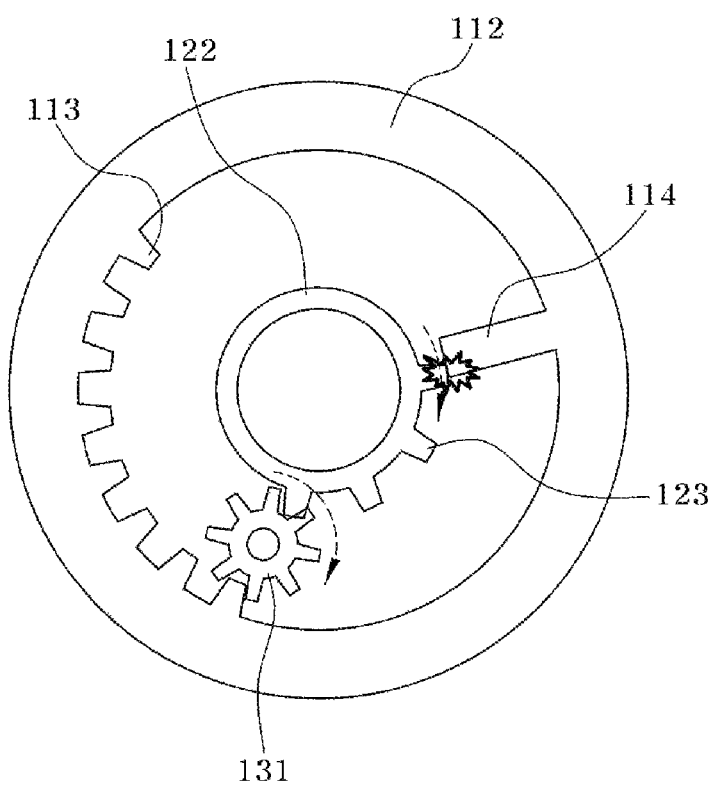
FIG. 5A is a cross-sectional view illustrating the driver in a state in which the mirror assembly starts to be deployed according to one exemplary embodiment of the present disclosure.

FIG. 5A illustrates a cross-sectional view of a state in which the mirror drive gear 123 is engaged with the drive gear 131 to pivot and open the mirror assembly 120. The mirror drive gear 123 may be disposed in a region having a predetermined angle based on the central axis on the outer side of the mirror driver 122 and thus, after the camera assembly 110 is deployed, the mirror drive gear 123 may be maintained in a state of being spaced apart from the drive gear 131.

However, when the failure of the camera assembly 110 is detected or the user's request is input, the controller 200 may be configured to further rotate the camera drive gear 113, and the boss portion 114 disposed inside the camera driver 112 may be moved to rotate the mirror drive gear 123 in a direction of being engaged with the drive gear 131. According to the further rotation of the camera driver 112, the camera drive gear 113 may be released from the drive gear 131 of the driver 130, and the mirror drive gear 123 and the drive gear 131 of the driver 130 may be engaged with each other.

Thus, the driving force of the driver 130 may be transmitted to the mirror assembly 120 to thus deploy the mirror assembly 120. As described above, according to the present disclosure, an angle and a time point at which the camera assembly 110 and the mirror assembly 120 are pivoted and opened may be adjusted based on a position of the boss portion 114, an angle at which the camera drive gear 113 is formed, and an angle at which the mirror drive gear 123 is formed.

Figure 5B:
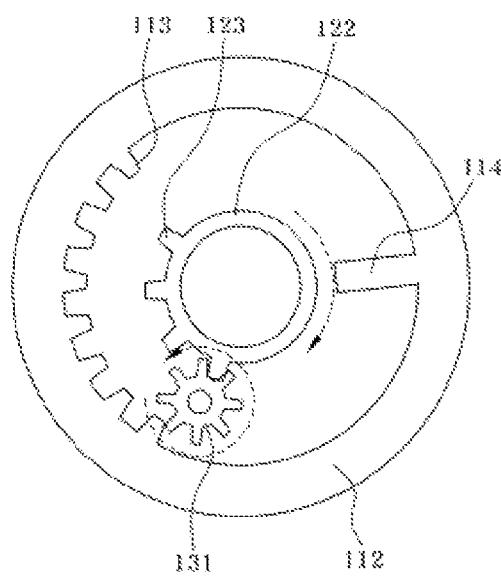
FIG. 5B is a cross-sectional view illustrating the driver in a state in which the mirror assembly is deployed according to one exemplary embodiment of the present disclosure.

FIG. 5B illustrates a cross-sectional view of a state in which the mirror drive gear 123 is deployed according to the driving force of the driver 130. As shown in the drawing, at least a portion of the camera assembly 110 may be inserted into and disposed inside the mirror housing 125, and one side of the mirror assembly 120 at which the mirror 121 is disposed may be configured to provide a side view of the vehicle.

Figure 6A:
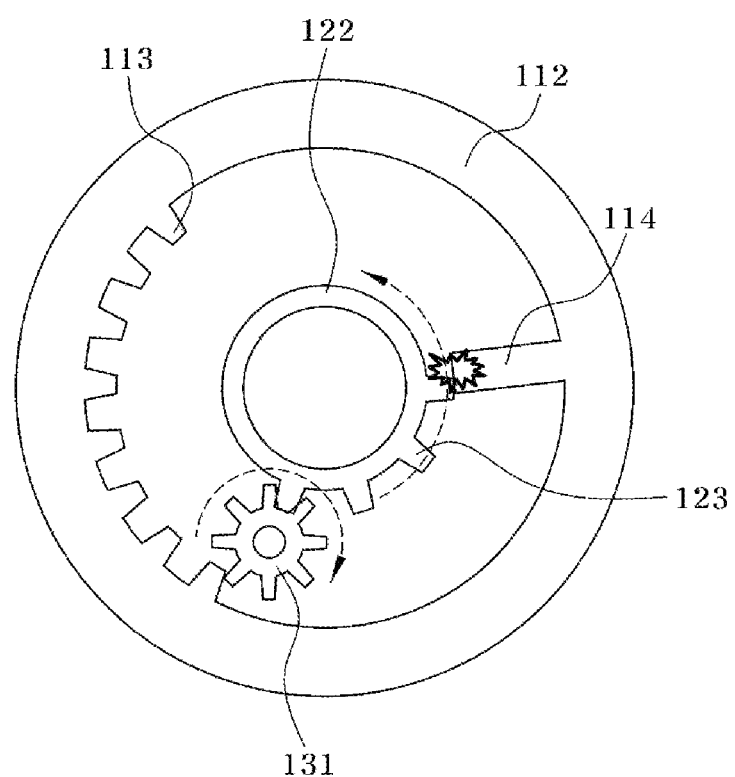
FIG. 6A is a cross-sectional view illustrating the driver in a folded state after the mirror assembly is deployed according to one exemplary embodiment of the present disclosure.

FIG. 6A illustrates a cross section of the driver 130 at a time point at which the camera monitoring system 100 in the deployed state is switched to the folded state. The deployed camera assembly 110 and the deployed mirror assembly 120 may be operated such that the mirror assembly 120 is switched to the folded state and, sequentially, the camera assembly 110 is folded in response to a signal applied to the controller 200.

In particular, when the camera assembly 110 is determined to be operating normally (e.g., without failure, error, or malfunction) or a user's request is input, the controller 200 may be configured to switch the mirror assembly 120 to the folded state to receive the side view of the vehicle through the camera assembly 110. When a folding switch signal of the mirror assembly 120 is applied to the controller 200, the drive gear 131 of the driver 130 may be operate to rotate the mirror drive gear 123 is rotated.

Since the driving force of the driver 130 may be transmitted to the mirror assembly 120 in a state in which the mirror drive gear 123 is engaged with the drive gear 131, the mirror assembly 120 may be folded in a state of being adjacent to the vehicle body 300. Simultaneously, the mirror drive gear 123 may be brought into contact with the boss portion 114 disposed inside the camera driver 112 while being rotated, and the boss portion 114 and the mirror drive gear 123 may be rotated simultaneously to thus switch the camera driver 112 including the boss portion 114 to a position engaged with the drive gear 131 of the driver 130. In a state in which the mirror assembly 120 is fully folded, the camera drive gear 113 may be switched to a state of being engaged with the drive gear 131 of the driver 130, and the mirror drive gear 123 may be switched to a state of being released from the drive gear 131.

Figure 6B:
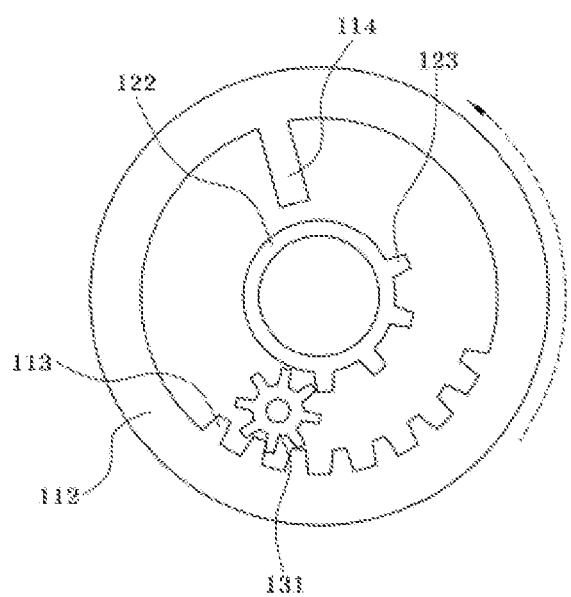
FIG. 6B is a cross-sectional view illustrating the driver in the folded state after the camera assembly is deployed according to one exemplary embodiment of the present disclosure.

FIG. 6B illustrates a cross-sectional view of a constituent part configured to fold the camera assembly 110 in the state in which the mirror assembly 120 is folded. As shown in the drawing, in the state in which the mirror assembly 120 is folded, the mirror drive gear 123 may be released from the drive gear 131 of the driver 130, and the camera drive gear 113 may be engaged with the drive gear 131 to receive the driving force of the driver 130. The camera assembly 110 receiving the driving force may be switched to the folded state to allow at least a portion of the camera assembly 110 to be inserted into the mirror assembly 120.

As described with reference to FIGS. 4A to 6B, the camera monitoring system 100 including the single drive shaft of the present disclosure is configured such that the camera assembly 110 and the mirror assembly 120 may be deployed sequentially according to a positional relationship of the drive gear 131, the camera drive gear 113, and the mirror drive gear 123, and the mirror assembly 120 and the camera assembly 110 are sequentially folded.

Figure 7:
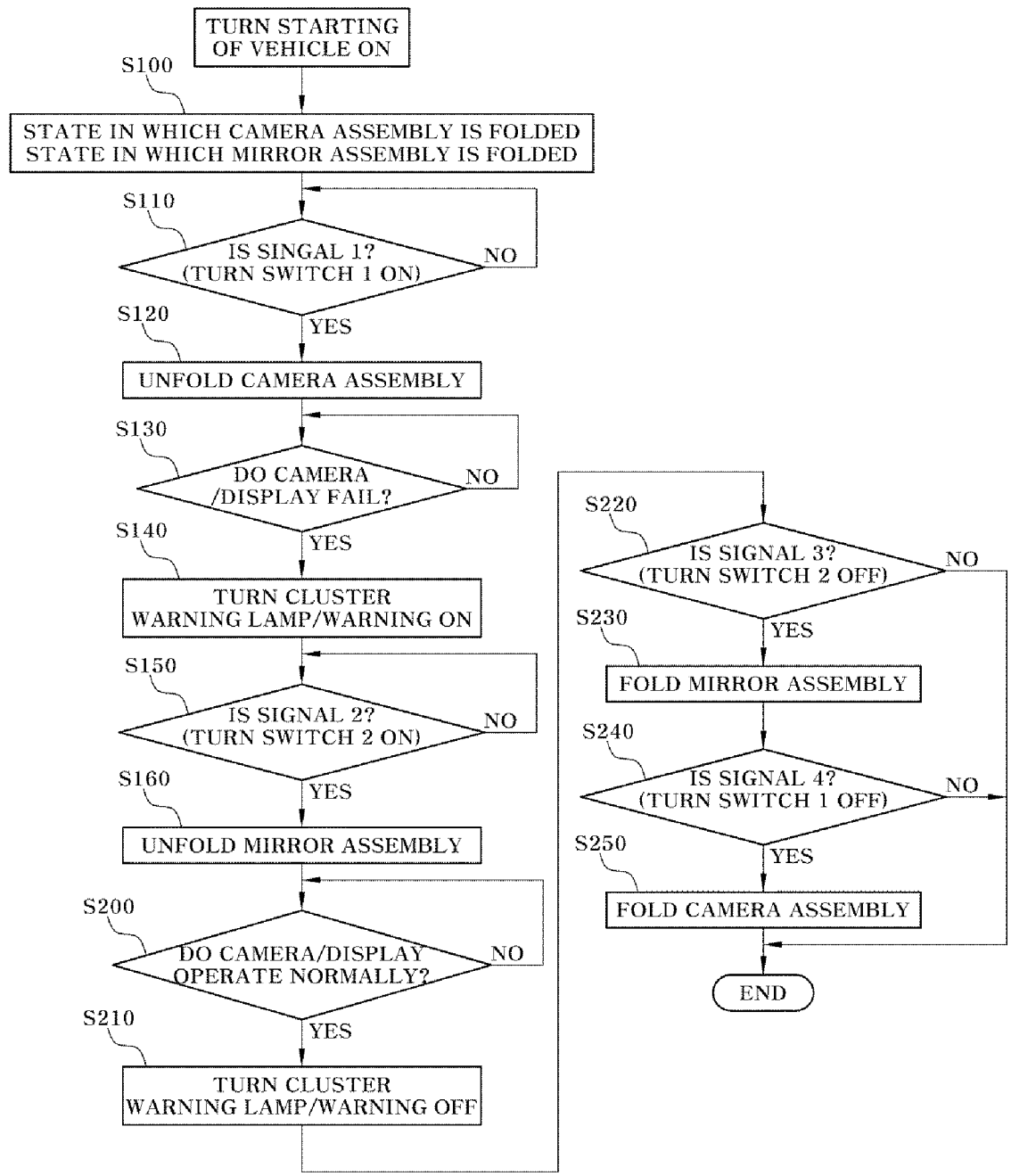
FIG. 7 is a flowchart illustrating a control operation of the camera monitoring system according to whether the camera monitoring system fails according to one exemplary embodiment of the present disclosure.

FIG. 7 illustrates a flowchart of a method of controlling the camera monitoring system 100 according to one exemplary embodiment of the present disclosure. In the case of a vehicle including the camera monitoring system 100, the controller 200 may be configured to determine whether the vehicle is in a starting on state and determine folded states of the camera assembly 110 and the mirror assembly 120 in the starting on state of the vehicle. Then, when a user's request is received, the camera monitoring system 100 may be configured to deploy the camera assembly 110 and configured to rotate the drive gear 131 of the driver 130 to apply a rotational force to the camera drive gear 113.

The camera driver 112 may be integrally rotated with the camera housing 115 according to the rotational force applied to the camera drive gear 113, thereby moving the camera assembly 110 to a position at which the camera 111 may capture a side image of the vehicle. In a state in which the camera assembly 110 is deployed, the method may include determining whether a configuration or a communication relationship of the camera assembly 110 fails. The failure state of the camera assembly 110 may include a failure of the camera 111, a failure of the display, and a communication failure between the camera 111 and the display.

When the camera assembly 110 is determined as failing, the method may include transmitting or outputting a warning alarm to the user and determining whether a deployment signal of the mirror assembly 120 is applied. When the warning alarm is transmitted to the user, the method according to one exemplary embodiment of the present disclosure may include turning a cluster warning lamp on and/or transmitting a warning sound. When the deployment signal of the mirror assembly 120 is applied in a state in which the camera assembly 110 fails, the driver 130 may be operated to apply a driving force to the mirror assembly 120.

In response to the deployment signal of the mirror assembly 120, the driver 130 may be configured to further rotate the camera driver 112, and the boss portion 114 disposed inside the camera driver 112 may be rotated to move the mirror drive gear 123 to be engaged with the drive gear 131 of the driver 130. When the mirror drive gear 123 is engaged with the drive gear 131, the camera drive gear 113 may be released from the drive gear 131 and thus, the driving force of the driver 130 may be applied to the mirror assembly 120.

The mirror assembly 120 to which the driving force is applied may be deployed to a position corresponding to at least a portion of the camera assembly 110. Thereafter, the method may include determining whether the camera assembly 110 operates normally, and, when the camera assembly 110 is determined as operating normally after the failure of the camera assembly 110, transmitting a notification to the user.

When a folding signal of the mirror assembly 120 is received from the user in a normal operating condition of the camera assembly 110, the controller 200 may be configured to fold the mirror assembly 120 and receive the side view of the vehicle through the camera 111. As described above, the present disclosure relates to the deployment and folding of the camera assembly 110 and the mirror assembly 120 of the camera monitoring system 100 of the vehicle, and more particularly, the present disclosure provides the method including controlling the deployment of the mirror assembly 120 in preparation for the failure of the camera assembly 110.

The present disclosure may obtain the following effects according to the above-described configuration, combination, and use relationship. In accordance with the present disclosure, a camera monitoring system capable of being deployed or switched to a folded state according to a driving environment so that the camera monitoring system being safe from an external environment maybe provided. Further, in accordance with the present disclosure, a camera monitoring system capable of improving driving stability by providing a side view when a camera assembly fails maybe provided.

The foregoing detailed description illustrates the present disclosure. Further, the foregoing is intended to illustrate and describe the exemplary embodiments of the present disclosure, and the present disclosure may be used in various other combinations, modifications, and environments. In other words, it is possible to make alternations or modifications without departing from the scope of the present disclosure disclosed in this specification, equivalents, and/or within the technical or knowledge scope in the art to which the present disclosure pertains. The described exemplary embodiments are intended to illustrate the best mode for carrying out the technical spirit of the present disclosure and various modification can made in the specific applications and uses of the present disclosure. Therefore, the detailed description is not intended to limit the present disclosure as in the disclosed exemplary embodiments. Further, it should be construed that the appended claims are intended to include another exemplary embodiment.

What is claimed is:

1. A camera monitoring system, comprising:
   a camera assembly configured to capture an image of an outer side surface of a vehicle;
   a mirror assembly disposed to overlap at least a portion of the camera assembly;
   a driver configured to perform deployment and folding of the camera assembly and the mirror assembly; and
   a controller including a processor configured to:
      operate the driver in response to an input of the deployment or folding of the camera assembly and the mirror assembly; and
      determine a failure of the camera assembly,
   wherein the camera assembly and the mirror assembly are moved based on a single drive shaft, and the controller is configured to deploy or fold the camera assembly and the mirror assembly,
   wherein the driver includes:
      a motor disposed in a vehicle body; and
      a drive gear disposed at one end of the motor and between a camera driver and a mirror driver;
      wherein, when the camera assembly is deployed, the drive gear is configured to be engaged with a camera drive gear, and, when the mirror assembly is deployed, the drive gear is configured to be selectively engaged with a mirror drive gear.

2. The camera monitoring system of claim 1, wherein the camera assembly includes:
   a camera housing engaged with a vehicle body;
   a camera disposed in the camera housing and configured to capture the image of the outer side surface of the vehicle;
   a camera driver configured to pivot the camera housing by the driver;
   a camera drive gear having at least a portion thereof disposed inside the camera driver and configured to transmit a driving force of the driver; and
   a display mounted inside the vehicle and configured to display the image captured by the camera.

3. The camera monitoring system of claim 1, wherein the mirror assembly includes:
   a mirror housing into which the camera assembly is inserted;
   a mirror driver configured to pivot the mirror housing by the driver; and
   a mirror drive gear having at least a portion thereof disposed inside the mirror driver and disposed to allow the mirror housing to be pivoted and deployed after the camera assembly is pivoted and deployed.

4. The camera monitoring system of claim 1, wherein the camera driver has a radius greater than a radius of the mirror driver, and the drive gear is disposed between the mirror driver and the camera driver.

5. The camera monitoring system of claim 1, further comprising:
   a boss portion spaced apart from a camera drive gear and disposed inside the camera driver,
   wherein after the camera assembly is deployed, a mirror drive gear is engaged with the drive gear.

6. The camera monitoring system of claim 5, wherein, in response to determining the failure of the camera assembly, the controller is configured to move the boss portion to engage the mirror drive gear and the drive gear with each other when the camera driver is further rotated.

7. A method of controlling a camera monitoring system, comprising:
- detecting, by a controller including a processor, states of a camera assembly and a mirror assembly;
- in response to detecting that camera assembly and the mirror assembly are in a folded state, determining, by the controller, whether a user request is input;
- deploying, by the controller, the camera assembly in response to receiving the user request;
- determining, by the controller, a failure of the camera assembly; and
- in response to determining the failure of the camera assembly, deploying, by the controller, the mirror assembly,
- wherein when deploying the mirror assembly, the camera assembly and the mirror assembly are moved based on a single drive shaft, and the controller is configured to deploy or fold the camera assembly and the mirror assembly,
- a motor disposed in a vehicle body; and
- a drive gear disposed at one end of the motor and between a camera driver and a mirror driver,
- wherein, when the camera assembly is deployed, the drive gear is configured to be engaged with a camera drive gear, and, when the mirror assembly is deployed, the drive gear is configured to be selectively engaged with a mirror drive gear.

8. The camera monitoring system of claim 7, wherein the determining the failure of the camera assembly includes outputting, an alarm to a user in response to determining the failure of the camera assembly.

9. The camera monitoring system of claim 8, wherein:
- the outputting of the alarm to the user includes determining, by the controller, whether a mirror deployment input of the user is received; and
- in response to receiving the mirror deployment input of the user, performing, by the controller, the deploying of the mirror assembly by the motor.

10. The camera monitoring system of claim 7, wherein, in response to determining the failure of the camera assembly, the deploying of the mirror assembly includes:
- determining, by the controller, whether the camera assembly operates normally; and
- in response to determining that the camera assembly operates normally, folding, by the controller, the mirror assembly by the driver.

* * * * *